(12) United States Patent
Mizuguchi et al.

(10) Patent No.: US 6,258,889 B1
(45) Date of Patent: Jul. 10, 2001

(54) EMULSION AND PRODUCTION PROCESS THEREFOR

(75) Inventors: Katsumi Mizuguchi; Yukiko Iida; Takeshi Nakasuka; Yoshihiko Saito, all of Hirakata (JP)

(73) Assignee: Nippon Bee Chemical Co., Ltd., Osaka (JP)

( * ) Notice: Subject to any disclaimer, the term of this patent is extended or adjusted under 35 U.S.C. 154(b) by 0 days.

(21) Appl. No.: 09/254,442

(22) PCT Filed: Aug. 4, 1997

(86) PCT No.: PCT/JP97/02709

§ 371 Date: Mar. 9, 1999

§ 102(e) Date: Mar. 9, 1999

(87) PCT Pub. No.: WO99/07758

PCT Pub. Date: Feb. 18, 1999

(51) Int. Cl.[7] .............................. C08L 37/00; C08L 43/00
(52) U.S. Cl. ......................... 524/531; 524/535; 524/832
(58) Field of Search .................................. 524/531, 535, 524/832

(56) References Cited

U.S. PATENT DOCUMENTS 5,349,022  9/1994  Ashihara et al. .

FOREIGN PATENT DOCUMENTS

| | | |
|---|---|---|
| 3-182534 A | 8/1991 | (JP) . |
| 5-209006 A | 8/1993 | (JP) . |
| 5-214188 A | 8/1993 | (JP) . |
| 6-16746 A | 1/1994 | (JP) . |
| 6-80738 A | 3/1994 | (JP) . |
| 6-179850 A | 6/1994 | (JP) . |
| 6-271642 A | 9/1994 | (JP) . |
| 8-157542 A | 6/1996 | (JP) . |

*Primary Examiner*—Edward J. Cain

(57) ABSTRACT

An object of the present invention is to provide an emulsion and its production process, which is used for coating of plastic materials such as polyolefin and has enough coating and adhesion to polyolefin materials and is excellent in compatibility with an acrylic resin and other resins and has high storage stability.

An emulsion includes:

A styrene-acryl-acid grafted polyolefin chloride, which includes a polyolefin chloride structure moiety (1), an acid anhydride and/or carboxylic acid structure moiety (2) bonded to the moiety (1) and a styrene-acryl based polymerization chain moiety (3) bonded to the moiety (2) excluding some of the acid anhydride groups and/or carboxylic acid groups, wherein a ratio of the moiety (2) to a sum of the moiety (1) and the moiety (2) is 1–10 weight %;

an emulsifier;

a basic substance made of at least one of amine compound and ammonia; and water.

A production process of an emulsion includes the step of preparing a suspension including the respective materials of an emulsion and further includes the step of reacting the materials.

9 Claims, 5 Drawing Sheets

EMULSION AND PRODUCTION PROCESS THEREFOR

TECHNICAL FIELD

The present invention relates to an improvement for an emulsion used for coating a surface of plastic materials such as polyolefin and a production process therefor.

BACKGROUND ART

Plastic materials used for automobile bumpers, molds and so on, generally, have bad wetting for coating compositions such as paint compositions and primer compositions and are inferior for coating. Especially, as polyolefin resins such as a polypropylene resin do not have polar groups in molecules and are chemically inactive, the plastic materials of polyolefin resin materials are much inferior for coating and adhesion to coating compositions.

Since the coating compositions in which the medium is an organic solvent have problems in flammability and since their solvents have high VOC ratios coating compositions made of an emulsion with an aqueous medium have been developed. However, this emulsion is low in coating and adhesion performance in comparison with the coating compositions in which the medium is an organic solvent.

To solve the problem of coating with the emulsion, JP-A-05-214188 discloses raising polarity by chlorinating polyolefin which is the main material of the coating compositions. However, as polyolefin chloride has low cohesion, its adhesion is insufficient. Then, JP-A-03-182534 discloses to improve adhesion by grafting polyolefin chloride with unsaturated polycarboxylic acid and/or acid anhydride. However, grafting with unsaturated polycarboxylic acid and/or acid anhydride which have high water-solubility, produces another problem of lowering the water-resistance of films.

Polyolefin chloride has high hydrophobicity and it is therefore difficult to disperse in water stably. JP-A-06-080738 discloses a technique to polymerize a reactive emulsifier made of acrylic resin based polymer, and when needed, other reactive monomers in a water medium under the existence of polyolefin and to improve water dispersion stability of polyolefin. This technique is to improve water dispersion stability of the emulsion by covering a polyolefin with an emulsifier by means of using the reactivity of an acrylic resin based polymer. However, an acrylic resin based polymer which has high hydrophilicity and polyolefin which has low polarity are incompatible. Therefore, an emulsion composition stabilized by an acrylic resin based polymer emulsifier has two problems. The first is stability with the passage of time (storage stability) of the water dispersion, and the second is that a coated film obtained from this is muddy. It is therefore required to improve the water dispersion of polyolefin chloride by another means.

As for polyolefin chloride, since the levels of coated film strength and weather resistance are low, there are cases where it is necessary to improve coated film strength and weather resistance by using polyolefin chloride together with an acrylic resin or other resin. In this case, it is difficult to use these together because polyolefin chloride and an acrylic resin or other resin are incompatible. Then, JP-A-05-209006 suggests choosing an acrylic resin which has comparatively good compatibility and grafting polyolefin chloride with this acrylic resin. This technique has the desired effects of using polyolefin chloride and acrylic resin together by grafting the acrylic resin and, further, maintains compatibility between polyolefin chloride and the acrylic resin or other resin using the compatibility improving effect of a grafted acrylic resin. However, in the grafting of an acrylic resin to polyolefin chloride, as there is a quantitative limit to compatibility, it becomes impossible to increase the amount of an acrylic resin and, further, there are not so many kinds of (meth) acryl based oligomers which have good compatibility with polyolefin chloride.

DISCLOSURE OF THE INVENTION

Objects of the Invention

An object of the present invention is to provide an emulsion and production process therefor, where the emulsion sufficiently coats and adheres to polyolefin materials, is highly water dispersible, has good storage stability and has excellent compatibility with an acrylic resin and other resins.

SUMMARY OF THE INVENTION

An emulsion according to the present invention comprises:

a styrene-acryl-acid grafted polyolefin chloride, which includes a polyolefin chloride structure moiety (1), an acid anhydride and/or carboxylic acid structure moiety (2) bonded to the moiety (1) and a styrene-acryl based polymerization chain moiety (3) bonded to the moiety (2) and wherein some of the acid anhydride groups and/or carboxylic acid groups remain, wherein a ratio of the moiety (2) to a sum of the moiety (1) and the moiety (2) is 1–10 weight %;

an emulsifier;

a basic substance that includes at least one of an amine compound and ammonia; and water.

It is preferable that a ratio of a sum of the moiety (1) and the moiety (2) to the moiety (3) is 10–200 weight %.

It is preferable that, in a sum of the moiety (1) and the moiety (2), the chlorine content ratio is 10–40 weight % and the molecular weight is 3000–200000.

It is preferable that the moiety (3) includes a styrene based monomer unit (3a) at 10–70 weight % of the whole moiety (3).

A production process of an emulsion according to the present invention comprises:

a suspension preparing step of obtaining a suspension including:

a precursor, which includes a polyolefin chloride structure moiety (1) and an acid anhydride and/or carboxylic acid structure moiety (2) bonded to the moiety (1), wherein a ratio of the moiety (2) to a sum of the moiety (1) and the moiety (2) is 1–10 weight %;

a styrene based monomer;

a first acryl based monomer, which has a group reactable with the moiety (2);

a second acryl based monomer, which does not have a group reactable with the moiety (2);

an emulsifier;

a basic substance including at least one of an amine compound and ammonia;

an oil soluble polymerization initiator; and water; and a reaction step of heating the suspension and grafting a styrene-acryl based polymerization chain to the precursor.

It is preferable that the suspension preparing step comprises the step of obtaining a homogeneous solution of the precursor by mixing the precursor at least with a styrene based monomer, a first acryl based monomer and a second acryl based monomer and further comprises the step of obtaining the suspension by mixing the homogeneous solution at least with water.

DETAILED DESCRIPTION OF THE INVENTION

[Emulsion]

An emulsion according to the present invention comprises a styrene-acryl-acid grafted polyolefin chloride (hereinafter, called merely "grafted polyolefin chloride"), an emulsifier, a basic substance and water.

Hereinafter, the respective components making up this emulsion composition are explained in detail.

(Grafted Polyolefin Chloride)

Grafted polyolefin chloride used in the present invention is the main material of an emulsion according to the present invention and includes a polyolefin chloride structure moiety (1), an acid anhydride and/or carboxylic acid structure moiety (2) and a styrene-acryl based polymerization chain moiety (3). The moiety (2) is bonded to the moiety (1) as the main chain. The moiety (2) is, also, bonded to the moiety (3) excluding some of the acid anhydride groups and/or carboxylic acid groups.

As the grafted polyolefin chloride includes the polyolefin chloride structure moiety (1), the emulsion sufficiently coats polyolefin material.

As the acid anhydride and/or carboxylic acid structure moiety (2) is bonded to the moiety (1), the polyolefin chloride structure moiety (1) as the main material of an emulsion composition has, also, sufficient adhesion to polyolefin material.

Where moiety (2) is bonded to moiety (1), some of the acid anhydride groups and/or carboxylic acid groups remain and any remaining group becomes a free group and/or carboxyl anion by a reaction with a basic substance and exhibits water solubility. Therefore, the polyolefin chloride structure moiety (1) can be easily emulsified and has high water dispersibility. As a result, an emulsion according to the present invention has good storage stability.

The polyolefin chloride structure moiety (1) is bonded to the styrene-acryl based polymerization chain moiety (3) through the said moiety (2). This moiety (3) improves the film strength and water resistance of the polyolefin chloride structure moiety (1) itself, and further improves the compatibility of the polyolefin chloride structure moiety (1) with an acrylic resin or other resins. As a result, an emulsion according to the present invention can be further improved in mechanical strength and top coat adhesion performance by adding other resins such as an aqueous acrylic resin. Here, "top coat adhesion" means adhesion between the under-coating and the top coat when the top coat is built up over the under-coatings containing this emulsion.

Examples of the polyolefin constituting the moiety (1) are as follows: a homocopolymer obtained by copolymerization of monomers such as ethylene, propylene; random copolymer or block copolymer obtained by copolymerization of two kinds or more of monomers as olefin monomer such as ethylene, propylene, 1-butene, 1-pentene, 1-hepten, 1-octene and vinyl monomer which has end vinyl group such as vinylalkylether, vinyl chloride, vinyl acetate and so on; a hydrogen additive of copolymerization such as styrene, butadiene, isoprene, dicyclopentadiene. These may be used either alone or in combination with each other. Though not especially limited, polypropylene is preferable because it is easily obtained and has high adhesion.

Examples of the acid anhydride and/or carboxylic acid constituting the moiety (2) are as follows: maleic acid, fumaric acid, maleic anhydride, citraconic acid, citraconic anhydride, itaconic acid, itaconic anhydride. These may be used either alone or in combination with each other. Though not especially limited, maleic anhydride and maleic acid are preferable because they are easily obtained.

The content ratio of the chlorine atom is not especially limited. However, it is preferably in the range of 10 to 40 weight %, more preferably 15 to 30 weight % to a sum of the moiety (1) and the moiety (2). When the content ratio of chlorine is less than 10 weight %, the capability of the grafted polyolefin for forming crystals increases and an emulsion does not become a homogeneous suspension and its storage stability decreases. On the other hand, when the content ratio of chlorine exceeds 40 weight %, adhesion of the grafted polyolefin chloride to polyolefin material and gasoline resistance decreases.

A ratio of the moiety (2) to a sum of the moiety (1) and the moiety (2) [100×moiety (2)/((moiety (1)+moiety (2))] is in the range of 1 to 10 weight %, preferably 2 to 8 weight %, more preferably 3 to 6 weight %. When the ratio of the moiety (2) is less than 1 weight %, as solubility of polyolefin chloride structure moiety decreases, the storage stability of the emulsion composition decreases and, further, as a combination rate of the moiety (3) to the moiety (1) decreases, compatibility of polyolefin chloride structure moiety to an acrylic resin or other resins decreases. On the other hand, when the ratio of the moiety (2) exceeds 10 weight %, as solubility of polyolefin chloride structure moiety increases too much, water resistance of a film decreases.

Number average molecular weight of a sum of the moiety (1) and the moiety (2) (hereinafter, may be called "sum moiety") is not limited especially. However it is preferably in the range of 3,000 to 200,000, more preferably, 5,000 to 100,000, most preferably, 30,000 to 100,000. When the number average molecular weight of the sum moiety is 3000 or less, when an emulsion is used as a paint such as an aqueous primer painting composition and an ink and so on, binder strength is low and a sufficient mechanical property is not obtained. Further, swelling with water or solvent increases and there is a tendency that water-resistance and gasoline resistance decreases. Now, the above-mentioned binder strength shows a mechanical strength resulting mainly from a resin composition, such as tensile strength, elongation modulus and hardness (elastic modulus). On the other hand, when the number average molecular weight of the sum moiety exceeds 200,000, the heat-melt temperature of the sum moiety increases and, when an emulsion according to the present invention is used as a paint such as an aqueous primer painting composition and an ink and so on, wetting is bad and adhesion is low. Compatibility of the sum moiety with an acrylic resin or other combined resins is low and the structure of a film is apt to become heterogeneous.

In the present invention, the said sum moiety is usually provided in the form of an acid grafted matter of polyolefin chloride. And, if the moiety (3) is combined to this, grafted polyolefin chloride is obtained. Therefore, hereinafter, this sum moiety may be called a precursor.

A ratio of the sum moiety as a sum of the moiety (1) and the moiety (2) to the moiety (3) [100×(moiety (1)+moiety (2))/moiety (3)] is not especially limited. However, it is preferably in the range of 10 to 200 weight %, more preferably 30 to 150 weight %, most preferably 50~120 weight %. When this ratio is less than 10 weight %, coating, workability, adhesion and storage stability of an emulsion decreases and, when it is used as a paint such as an aqueous primer painting composition and an ink and so on, there is the case that sufficient efficiency is not obtained. On the other hand, when this ratio exceeds 200 weight %, compatibility with an acrylic resin or other resins decreases.

The styrene-acryl based polymerization chain moiety (3) includes the styrene based monomer unit (3a) resulting from a styrene based monomer as well as the first acryl based monomer unit (3b) resulting from the first acryl based monomer which has a group reactable with the acid anhydride group and/or carboxylic acid group of the moiety (2) for the purpose of combining moiety (3) with the moiety (2). When needed, the moiety (3) includes the second acryl based monomer unit (3c) derived from a second acryl based monomer which does not have a group reactable with the acid anhydride group and/or carboxylic acid group. The principal portion of the moiety (3) is formed by an addition reaction of opening the carbon atom—carbon atom double bond in the above monomer.

The above styrene based monomer unit (3a) improves largely the compatibility of the polyolefin chloride structure moiety with other resins and contributes to the improvement of the water dispersion stability of an emulsion. The first acryl based monomer (3b) combines the styrene based monomer unit (3a) to the moiety (2) and, as it results from an acryl based monomer unit, it contributes in itself to improve compatibility with other resins of the polyolefin chloride structure moiety to some extent. The second acryl based monomer unit (3c) added when needed can contribute to an adjustment of the glass transition temperature of all of the moiety (3) and adjustment of the solubility and compatibility of grafted polyolefin chloride and, as a result, can contribute to an improvement in storage stability of an emulsion and an improvement in adhesion, and to an improvement in water resistance and solvent resistance and so on of a film by selecting the kinds of monomer which are introduced to this unit.

A ratio of the styrene based monomer unit (3a) in the moiety (3) is not especially limited. However, it is preferably in the range of 10 to 70 weight %, more preferably 15 to 50 weight %, most preferably, 20 to 40 weight %. When the ratio of the styrene based monomer unit (3a) is less than 10 weight %, the water dispersion stability of an emulsion decreases and a compatibility improvement effect of the polyolefin chloride structure moiety with an acrylic resin or other resins is hardly obtained. On the other hand, when the ratio of the styrene based monomer unit (3a) exceeds 70 weight %, the glass transition temperature of the moiety (3) increases too much and a film becomes weak and is apt to suffer inferiority by light.

As for the acryl based monomer unit in the moiety (3), at least a part is a first acryl based monomer unit (3b). Accordingly a ratio of the first acryl based monomer unit (3b) in the moiety (3) is not especially limited. However, it is preferably in the range of 2 to 50 weight %, more preferably 4 to 40 weight %, most preferably 5 to 25 weight %. When the ratio of the first acryl based monomer unit (3b) is less than 2 weight %, a grafting amount of the moiety (3) to the polyolefin chloride structure moiety decreases and there is a tendency that compatibility with other resins of the polyolefin chloride structure moiety decreases. On the other hand, when the ratio of the first acryl based monomer unit (3b) exceeds 50 weight %, as a group which is reactable with the acid anhydride group and/or carboxylic acid group in the first acryl based monomer unit (3b) and remains in a free condition, there is a case that water resistance of a film decreases.

As the styrene based monomer, for example, a styrene based monomer such as styrene, vinyltoluene, α-methylstyrene is exemplified. These may be used either alone or in combinations with each other. Among these, styrene is easily introduced to the moiety (3) and styrene can easily dissolve the grafted polyolefin chloride precursor as a material and can easily react with the precursor and the acryl based monomer homogeneously in the production process of an emulsion composition mentioned below. Therefore, styrene is preferable.

As the group which is found in the first acryl based monomer unit (3b) and which is reactable with the acid anhydride group and/or carboxylic acid group, a hydroxyl group, primary class or secondary class amino group, epoxy group, aziridine group, oxazoline group, isocyanate group and alkoxy silyl group and so on, are exemplified. Among these groups, hydroxyl group and epoxy group are preferable as a reaction can be carried out under mild condition in the production process of an emulsion composition mentioned below.

Examples of the first acryl based monomer which has a hydroxyl group and an epoxy group are as follows: (meth)acrylate kinds which have a hydroxyalkyl group, such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate and 6-hydroxyhexyl (meth)acrylate; γ-butyrolactone ring-opening addition compound to 2-hydroxyethyl (meth)acrylate; ε-caprolactone ring-opening addition compound to 2-hydroxyethyl (meth)acrylate; ethylene oxide ring-opening addition compound to (meth)acrylic acid; propylene oxide ring-opening addition compound to (meth)acrylic acid; vinyl monomer kinds including a hydroxyl group, such as 4-hydroxybutyl vinyl ether and p-hydroxystyrene, and a monomer including an epoxy group, such as glycidyl (meth)acrylate, methyl glycidyl (meth)acrylate, 3,4-epoxycyclohexyl (meth)acrylate and allyl glycidyl ether. These may be used either alone or in combinations with each other.

Examples of the second acryl based monomer are as follows: (meth)acrylic acid ester kinds which have a hydrocarbon substituent such as methyl (meth)acrylate, ethyl (meth)acrylate, n-propyl (meth)acrylate, n-butyl (meth)acrylate, i-butyl (meth)acrylate, t-butyl (meth)acrylate, sec-butyl (meth)acrylate, n-pentyl (meth)acrylate, lauryl (meth)acrylate, dodecyl (meth)acrylate, 2-ethylhexyl (meth)acrylate and cyclohexyl (meth)acrylate; ethylenically unsaturated nitrile kinds such as acrylic nitrile and methacrylonitrile; N-alkoxy substituted amide kinds such as N-methoxy methyl acrylamide, N-ethoxy methyl acrylamide and N-butoxy methyl acrylamide; ethylenically unsaturated basic monomer kinds such as dimethylamino ethyl (meth) acrylate and diethylamino ethyl (meth) acrylate. These may be used either alone or in combination with each other.

(Emulsifier)

The emulsifier used in the present invention emulsifies grafted polyolefin chloride sufficiently and operates to improve the storage stability of an emulsion composition.

Though not especially limited, examples of the emulsifier are as follows: a nonionic emulsifier such as polyoxyethylene alkyl ether, polyoxyethylene alkyl phenol ether, polyoxyethylene aliphatic ester, polyoxyethylene polyhydric alcohol fatty acid ester, polyhydric alcohol fatty acid ester, polyoxyethylene propylene polyol and alkylol amide; an anionic emulsifier such as alkylsulfate ester salt, alkyl phenol sulfonic acid salt and sulfo succinic acid ester; an amphoteric emulsifier such as alkyl betaine and alkyl imidazoline; a resin emulsifier such as a urethane resin including a polyoxyethlene group and a urethane resin including a carboxylate group; and a cationic emulsifier such as imidazoline laurate, lauryl trimethylammonium chloride, stearyl betaine and distearyl dimethylammonium chloride. These may be used either alone or in combinations with each other. Among these, a nonionic emulsifier is preferable because the water resistance of a film increases as it does not have an ionic polar group which has high hydrophilicity.

As an emulsifier, in addition to the above-mentioned nonreactive emulsifier, a reactive emulsifier can be used. By using a reactive emulsifier together with a nonreactive emulsifier, water resistance of a film is improved. A reactive emulsifier has a hydrophilic group (for example, poly (ethylene oxide) group, a hydroxyl group, a carboxyl group, a sulfonic acid group, a sulfuric acid group and an amino group and so on) and a hydrophobic group (for example, an alkyl group, a phenyl group, a fluoroalkyl group and a polysiloxane group and so on), and further, a reactive group, for example, of a radical polymerization unsaturated bond and so on. Examples of a reactive emulsifier are as follows: Adecariasope NE-10, NE-20, NE-30 (made by Asahi denka kogyosha) having an allyl ether group, a poly(ethylene oxide) group and a nonyl phenyl group; SE-10N (made by Asahi denka kogyosha) having an allyl ether group, a poly(ethylene oxide) group, a sulfuric acid group and a nonyl phenyl group; RN-20, RN-30, RN-50 (made by Daiichi kogyo seiyakusha) having a propenyl group at a phenyl group in a polyoxyethylene nonyl phenyl ether group; HS-10, HS-20 (made by Daiichi kogyo seiyakusha) having a propenyl group at a phenyl group in a polyoxyethylene nonyl phenyl ether sulfate ester group; S-120A, S-180A (made by Kao sya) having an allyl group and a sulfonic acid group; and compounds having a methcryloyl group or an acryloyl group (made by Nihon Nyuukazai sya), such as Antox MS-60 as bis(polyoxyethylene polycyclic phenyl ether) methacrylate sulfate ester salt, RMA-564, RMA-568, RMA-506 as polyoxyethylene nonyl phenyl ether acrylate, RMA-1120, MPG130-MA as polyoxyethylene alkyl ether methacrylate and MA-30, MA-50, MA-100 as polyoxyethylene methacryl ester. These may be used either alone or in combinations with each other. Among these, a reactive emulsifier having a methcryloyl group or an acryloyl group is preferable as it is easily copolymerised with a styrene based monomer, the first acryl based monomer or the second acryl based monomer in the production process of an emulsion composition mentioned below.

(Basic Substance)

The basic substance used in the present invention is added to the acid anhydride group and/or the carboxylic acid group which is included in the moiety (2) in the grafted polyolefin chloride and neutralizes these groups and raises the hydrophilicity of the grafted polyolefin chloride and operates to improve the storage stability of an emulsion composition.

Examples of the basic substance (which may include at least one of an amine compound and ammonia) are listed below. Examples of an amine compound are as follows: monoamine kinds such as trimethylamine, triethylamine, butylamine, dibutylamine and N-methylmorpholine; polyamine kinds such as ethylenediamine, hexamethylenediamine, piperazine, isophorone diamine, triethylene diamine and diethylene triamine; and alkanolamine kinds such as monoethanolamine, diethanolamine, triethanolamine, N-methyl diethanolamine, N,N-dimethyl ethanolamine and 2-amino-2-methyl propanol. These may be used either alone or in combinations with each other. These may be jointly used with ammonia.

(Emulsion)

An emulsion according to the present invention includes the above-mentioned grafted polyolefin chloride, an emulsifier, a basic substance and water, and further, if needed, can include other compositions mentioned below.

The mixing ratio of grafted polyolefin chloride is preferably in the range of 5 to 50 weight % of whole emulsion, more preferably 15 to 40 weight %, most preferably 20 to 35 weight %. When the mixing ratio of grafted polyolefin chloride is less than 5 weight %, the mixing ratio of water is comparatively too much, and workability decreases in the production process of an emulsion composition mentioned below. When an emulsion is used as a paint such as an aqueous primer painting composition and an ink and so on, the amount of grafted polyolefin chloride as the main component is small and a sufficient workability is not obtained. On the other hand, when it exceeds 50 weight %, it is difficult to control heating at the time of polymerization in the production process of the emulsion composition mentioned below and there is a tendency that the stability of an emulsion falls as the polymer particle concentration increases too much.

The mixing ratio of an emulsifier is established properly by the grafted polyolefin chloride and the basic substance and their mixing ratio with water and is preferably in the range of 3 to 40 parts by weight and, more preferably 5 to 20 parts by weight to 100 parts by weight of grafted polyolefin chloride. When the emulsifier is less than 3 parts by weight, the storage stability of an emulsion falls and cohesion and sedimentation are apt to occur in the polymerization step in the production process of emulsion composition mentioned below. On the other hand, when it exceeds 40 parts by weight, the emulsifier remains in the film in large quantities and water resistance and weather resistance of a film falls.

The mixing ratio of the basic substance is adjusted by the grafted polyolefin chloride and the emulsifier and their mixing ratio with water, and the basic substance is mixed especially with consideration to a sufficiently neutralizing acidic functional group which is included in the grafted polyolefin chloride and emulsifier and is, for example, in the range of 0.1 to 5 weight % of the whole emulsion. The pH of an emulsion determined by a mixture of the basic substance is preferably in the range of 7 to 11, more preferably 7.5 to 10.5, most preferably 8 to 10. When the pH of an emulsion is less than 7, neutralization is not sufficient and there is the case that the storage stability of an emulsion falls. On the other hand, when the pH of an emulsion exceeds 11, a free basic substance exists excessively in the emulsion and an amine smell is strong and the emulsion can not be used as a paint such as an aqueous primer painting composition and an ink and so on.

The mixing ratio of water is preferably in the range of 50 to 95 weight % of the whole emulsion, more preferably 60 to 85 weight %, most preferably 65 to 80 weight %. When the mixing ratio of water is less than 50 weight %, the total solids in an emulsion becomes excessive and there is the case that the storage stability of an emulsion falls. On the other hand, when the mixing ratio of water exceeds 95 weight %, workability becomes bad in the production process of an emulsion composition mentioned below and when an emulsion is used as a paint such as an aqueous primer painting composition and an ink and so on, the amount of grafted polyolefin chloride as the main component is comparatively small and sufficient film properties are not obtained.

The average particle-size of the polymer (of which the main component is grafted polyolefin chloride) in an emulsion is not especially limited but is preferably in the range of 0.01 to 10 μm, more preferably 0.03 to 5 μm, most preferably 0.05 to 1 μm. When the average particle-size of the polymer particle is less than 0.01 μm, large quantities of the emulsifier is necessary and water resistance and weather resistance of a film falls. On the other hand, when the average particle-size of the polymer particle exceeds 10 μm, the storage stability of an emulsion falls and, as the volume of the polymer particle is large, much melting heat quantity and time for making a film are necessary and heat flow falls and, when an emulsion is used as a paint such as an aqueous primer painting composition and so on, there is a likelihood that external appearance, water resistance and solvent resistance and so on of a film decreases.

An emulsion according to the present invention can comprise other compositions. Examples of other compositions are as follows: an emulsion including an acrylic resin, an urethane resin, a polyester resin, a polyolefin resin, a melamin resin, an alkyd resin, an epoxy resin, a vinyl resin and a cellulose resin and so on; aqueous resins such as an aqueous acrylic resin, an aqueous urethane resin, an aqueous polyester resin, an aqueous polyolefin resin, an aqueous melamin resin, an aqueous alkyd resin, an aqueous epoxy resin, an aqueous vinyl resin and an aqueous cellulose resin and so on; additives such as a viscosity increasing agent, an antifoaming agent, a surface adjusting agent, an ultraviolet absorbing agent and an antioxidant; inorganic pigments such as titanium oxide, carbon black, iron oxide, chromium oxide and Prussian blue; organic pigments such as an azo based pigment, an anthhracene based pigment, a perylene based pigment, a quinacridon based pigment, an indigo based pigment and a phthalocyanine based pigment; dyestuff; inorganic fillers such as talc and silica, conductive fillers such as conductive carbon, conductive filler and metal powder, auxiliary mixing agents such as an organic reforming agent, a stabilizer, a plasticizer and an additive. When an emulsion is used as a paint such as an aqueous primer painting composition and an ink and so on, the above-mentioned other compositions are mixed to improve efficiency in each usage. Aqueous resins as other components may be mixed beforehand, or may be produced at the same time as the reaction process, or may be added after the reaction process, in the production process mentioned below.

An emulsion according to the present invention may include a grafted acid of the polyolefin chloride used as a raw material in the production process mentioned below, or an acryl based polymer such as a styrene-acryl based polymer produced as a by-product in the production process mentioned below.

An emulsion according to the present invention can include an organic solvent. If an organic solvent is used, workability is improved and dispersibility of above-mentioned other compositions such as pigment is also improved. However, an organic solvent is preferably not included as the storage stability of an emulsion is high and because of compliance with recent regulations of organic solvents. Examples of an organic solvent are as follows: aromatic hydrocarbons such as toluene and xylene; aliphatic hydrocarbons such as hexane, heptane and octane; alicyclic hydrocarbons such as cyclohexane, methylcyclohexane and cyclopentane; esters such as ethyl acetate, n-butyl acetate, isobutyl acetate and amyl acetate; ketones such as acetone, methyl ethyl ketone, methyl isobutyl ketone and cyclohexane; alcohols such as methanol, ethanol, isopropanol, n-butanol, 2-butanol, n-propylene glycol and isopylene glycol; cellosolves such as ethylene glycol monomethyl ether, ethylene glycol monobutyl ether and ethylene glycol monomethyl ether acetate; carbitols such as diethylene glycol monoethyl ether; propylene glycol monoalkyl ethers such as propylene glycol monomethyl ether, propylene glycol monoethyl ether and propylene glycol monobutyl ether; and other solvents such as dioxane, N-methylpyrrolidone, dimethylformamide and diacetone alcohol.

An emulsion according to the present invention is suitable for a coating composition used in a plastic formation or film which is made of polyolefin material such as a polypropylene polymer, an ethylene-propylene copolymer and an ethylene-propylene-diene copolymer. This emulsion can be used suitably for a painting application such as an aqueous primer painting composition as a polyolefin material and so on and for resin usage as an ink, an adhesive and a sealing agent.

(Aqueous Primer Painting Composition)

Hereinafter, an aqueous primer painting composition as especially suitable for use as an emulsion of the present invention is explained in detail.

It is preferable that the aqueous primer painting composition includes the above-mentioned other compositions. Especially if it includes inorganic filler, adhesion and workability are much improved. By the aqueous primer painting composition including a conductive filler, a coating film having conductivity is obtained. If an organic solvent is included in the composition, pigment dispersion and workability and so on can be improved.

An aqueous primer painting composition is, for example, used for the painting of polyolefin material such as bumpers of cars. By painting the aqueous primer painting composition on the polyolefin material and then drying such, a primer coating film is formed on the polyolefin material.

As for a coating process of the aqueous primer painting composition onto polyolefin material, either of air spray painting and airless spray painting can be carried out. The primer painting composition is painted to a certain thickness. For example, a drying film thickness is preferably in the range of 2 to 30 μm, more preferably 5 to 20 μm. When a drying film thickness is less than 2 μm, there is the case that a successive homogeneous film is not obtained because it is too thin. On the other hand, when drying film thickness exceeds 30 μm, there is a case that water resistance and weather resistance fall. Though drying of a coating film may be carried out at room temperature, it is preferably carried out with heating at 60 to 140° C. to improve workability and properties of a matter. Now, when heating and drying, the drying temperature must be selected in range wherein thermal deformation of the material does not occur considering heat resistance of material.

Coating of the polyolefin material is carried out by applying a top-coating to a primer coating film. The kind of top-coating is not especially limited and, for example, one-liquid film baking coating, two-liquid urethane coating and one-liquid lacquer coating and so on, are exemplified.

Aqueous primer painting composition is used suitably especially for applying of polypropylene material among polyolefin material.

[Production Process for Emulsion]

A production process for the above-mentioned emulsion is not especially limited. However, a preferred production process is explained hereinafter in detail and this production process obtains an emulsion efficiently and easily.

A production process for an emulsion according to the present invention includes a suspension-preparing step of obtaining a suspension that includes a grafted polyolefin chloride precursor which includes the acid anhydride and/or carboxylic acid structure moiety (2), a styrene based monomer, a first acryl based monomer which has a group reactable with the moiety (2), a second acryl based monomer which does not have a group reactable with the moiety (2), an emulsifier, a basic substance, an oil soluble polymerization initiator and water, and further includes the steps of heating the suspension and grafting styrene-acryl based polymerization chain to the precursor. The said precursor includes the polyolefin chloride structure moiety (1) and the acid anhydride and/or carboxylic acid structure moiety (2) bonded to the moiety (1), and a ratio of the moiety (2) to a sum of the moiety (1) and the moiety (2) is 1–10 weight %. The said basic substance includes at least one of an amine compound and ammonia.

The precursor usually has a low solubility in the acryl based monomer. When suspending the precursor in water, the first acryl based monomer and the second acryl based monomer, the suspension is heterogeneous and is not stable. If the next reaction step is carried out in the heterogeneous condition, a homogeneous and stable emulsion is not obtained. However, as the precursor has high solubility in a styrene based monomer, by including a styrene based monomer in the above-mentioned respective composition, the precursor is sufficiently solvated and the suspension becomes homogeneous and stable and a homogeneous and stable emulsion is obtained after reaction.

The above explanation about the emulsion is fundamentally applied to the precursor itself and to the moiety (1) and the moiety (2). The styrene based monomer, the first acryl based monomer, the second acryl based monomer, the emulsifier and the basic substance are the same case. Hereinafter, matters which are not mentioned above, and less important matters about the process, are explained.

When a chlorine content ratio in the precursor is less than 10 weight %, the polarity of the precursor decreases too much and the precursor is not sufficiently dissolved in the styrene based monomer and the acryl based monomer is not obtained by the step of preparing a suspension and a stable suspension. On the other hand, when a chlorine content ratio in the precursor exceeds 40 weight %, elimination of chloride is apt to occur in a subsequent reaction step. The precursor is, when its number average molecular weight is 200000 or more, not sufficiently dissolved in the styrene based monomer and the acryl based monomer as its molecular weight is too large, and a stable suspension is not obtained. Also, the polymer particles contained in the emulsion are not minute and the storage stability of the emulsion decreases.

A production process for the precursor is not especially limited. However, for example, the precursor may be obtained with internal grafting by reacting a chlorine (a) and a unsaturated acid anhydride and/or carboxylic acid (b) with the above-mentioned polyolefin. Now, as for the reaction order of above-mentioned elements (a) and (b), the order of (b)→(a) is employed. That is to say, the following order is employed: the order of adding unsaturated acid anhydride and/or carboxylic acid to polyolefin while using a radical occurring catalyst such as peroxide under the existence or nonexistence of a solvent and grafting and further blowing chlorine gas and substituting for some of the hydrogen atoms in the polyolefin skeleton with chlorine. The reaction may be carried out in the order of (a)→(b).

As an oil-soluble polymerization initiator used in the present invention, an oil-soluble polymerization initiator of which solubility in water is 5% or less is suitably used. Examples are as follows: azo based initiator kinds such as 2,2'-azobis(2,4-dimethyl valeronitrile), 2,2'-azobis(2-methyl butyronitrile) and dimethyl 2,2'-azobis(2-methyl propionate); diacyl peroxide kinds such as lauroyl peroxide, benzoyl peroxide and orthomethyl benzoyl peroxide; alkyl perester kinds such as t-butyl peroxypivalate and t-butyl-oxy-2-ethyl hexanate t-butyl peroxyisobutylate; and percarbonate kinds such as diisopropyl peroxydicarbonate and t-butyl peroxyisobutylcarbonate. These may be used either alone or in combination with each other.

Polymerization may be carried out with the oil-soluble polymerization initiator together with a water-soluble initiator. Examples of a water-soluble initiator are as follows: azo based water-soluble initiator such as 2,2'-azobis(2-methyl-N-phenylpropionamidine)dihydrochloride, 2,2'-azobis(2-methylpropionamidine)dihydrochloride, 2,2'-azobis[N-(2-hydroxyethyl)-2-metylpropionamidine]dihydrochloride, 2,2'-azobis[2-(3,4,5,6-tetrahydropyrimidinyl-2)propane]dihydrochloride, 2,2'-azobis[2-(2-imidazolinyl-2)propane and 4,4'-azobis(4-cyano valeric acid); and a perrsulfate based water-soluble initiator such as ammonium persulfate and potassium persulfate. These may be used either alone or in combination with each other.

As for a mixing ratio of the precursor, the styrene based monomer, the first acryl based monomer, the second acryl based monomer, the emulsifier, the basic substance, the oil-soluble polymerization initiator and water contained in suspension, though it is not especially limited, it is preferable that the precursor is in the range of 2 to 30 weight %, the styrene based monomer is in the range of 1 to 20 weight %, the first acryl based monomer is in the range of 0.2 to 5 weight %, the second acryl based monomer is in the range of 2 to 40 weight %, the emulsifier is in the range of 0.5 to 10 weight %, the basic substance is in the range of 0.1 to 5 weight %, the oil-soluble polymerization initiator is in the range of 0.01 to 2 weight % and water is in the range of 50 to 95 weight %, as to the whole suspension.

When a mixing ratio of the precursor is less than 10 weight % as to the sum of the styrene based monomer and the acryl based monomer, it is difficult to prepare a stable suspension. On the other hand, when it exceeds 200 weight %, the precursor is in excess and the styrene monomer and the acryl based monomer are not sufficiently solvating and therefore it is difficult to prepare a stable suspension.

A mixing ratio of the styrene based monomer to the sum of the styrene monomer and the acryl based monomer is preferably in the range of 10 to 70 weight %, more preferably 15 to 50 weight %, most preferably 20 to 40 weight %. When the styrene based monomer is less than 10 weight % to the sum of the both monomers, the amount of styrene based monomer is too small and the precursor is not sufficiently dissolved in the monomer. On the other hand, when the styrene based monomer, which has a slow rate of polymerization, exceeds 70 weight % as to the sum of the both monomers, there is the case that the styrene based monomer remains unreacted.

In the production process for an emulsion according to the present invention, except as to the above-mentioned necessary compositions, the above-mentioned other compositions concerning the emulsion and an organic solvent may be used. Now, an organic solvent is not necessary as the styrene based monomer that sufficiently dissolves the precursor.

In the step of preparing the suspension, a solution is prepared to include the precursor, the styrene base monomer, and the acryl based monomer as main components and further to include the oil-soluble polymerization initiator. This solution is then dispersed in water as oil drops of little particle diametrical area so that heterogeneous portions do not occur, so that polymer particles are minute and so that storage stability and compatibility of emulsion increase. At the time of preparation, a suspension can be produced by heating at a temperature wherein a reaction (polymerization) does not occur. As all of the precursor, the styrene based monomer, the acryl based monomer and the oil-soluble polymerization initiator are thermally unstable, heating is preferably at 130° C. or below, more preferably, at 100° C. or below, most preferably at 80° C. or below.

Addition of water can be carried out by a common method among experts generally called "after-emulsification". For example, a suspension can be made easily by dropping water or hot water when applying a high shearing force such as stirring. However, addition of water is never limited to the after-emulsification method. "After-emulsification" is carried out, for example, at a temperature in the range from room temperature to 95° C. However, the temperature may be further raised by applying pressure. Though "after-emulsification" can be carried out at 100 to 1000 rpm using general emulsification apparatus, mechanical shearing emulsification tools such as a homogenizer, a high-pressure emulsification tool and a disper mill may be used together when needed.

As steps of preparing the suspension, for example, the following steps (1)–(4) can be listed.

(1) A step of obtaining a homogeneous solution by the step of mixing the precursor, the styrene based monomer, the acryl based monomer, the emulsifier and the basic substance (the step of preparing a homogeneous solution) and the step of mixing water to this homogeneous solution and the step of suspending and further the step of mixing the oil-soluble polymerization initiator and the step of adding the oil-soluble polymerization initiator in oil drops of which the main components are the precursor and the monomer and the step of preparing a suspension.

(2) A step of obtaining a homogeneous solution by the step of mixing the precursor, the styrene based monomer, the acryl based monomer and the emulsifier (the step of preparing homogeneous solution) and the step of mixing water and the basic substance to this homogeneous solution and the step of suspending and further the step of mixing the oil-soluble polymerization initiator and the step of adding the oil-soluble polymerization initiator in oil drops of which the main components are the precursor and monomer and the step of preparing a suspension.

(3) A step of obtaining a homogeneous solution by the step of mixing the precursor, the styrene based monomer, the acryl based monomer, the emulsifier, the oil-soluble polymerization initiator and the basic substance (the step of preparing homogeneous solution) and the step of mixing water to this homogeneous solution and the step of suspending and the step of preparing a suspension.

(4) A step of obtaining a homogeneous solution by the step of mixing the precursor, the styrene based monomer, the acryl based monomer, the oil-soluble polymerization initiator and the emulsifier basic (the step of preparing the homogeneous solution) and the step of mixing water and the basic substance to this homogeneous solution and the step of suspending and the step of preparing a suspension.

In the above noted step (1), as an oil-soluble polymerization initiator is not used in the step of preparing the homogeneous solution, the homogeneous solution can be prepared in a short time by heating to a high temperature of 120 to 130° C. Also, in the step of suspending, "after-emulsification" can be carried out by heating similarly and applying a high shearing force.

As the basic substance is, according to its kind, reactable with a monomer, it is necessary that it does not exist together with a monomer or, when it does exist together, it is adjusted in a very mild condition. In the above noted step (2), as a basic substance is not used in the step of preparing the homogeneous solution, the kind of basic substance that can be used subsequently can be selected comparatively freely and side reactions can be controlled.

In the above noted step (3), as there is no step of adding an oil-soluble polymerization initiator in oil drops, the time for production can be made short. It is possible to heat immediately to the necessary temperature for reaction without making the temperature of the suspension low in the step of suspending or after the step of suspending, and the time for the production of the emulsion can be made short.

The above noted step (4) has merits of the above noted steps (2) and (3), and is the most economical producing method. However, the selection of the oil-soluble polymerization initiator becomes very difficult according to the kind of each composition, the mixing amount, the conditions and the apparatus. That is to say, as the oil-soluble polymerization initiator is dissolved when the temperature of mixing solution is raised to 80° C. or more, in the step of preparing the homogeneous solution by mixing the oil-soluble polymerization initiator, the selection should be carried out with consideration of such a condition.

In the above noted steps (1) and (2), generally, it is stirred for 10 minutes to 5 hours at a temperature wherein the styrene based monomer and the acryl based monomer are not reacted (polymerized). When the oil-soluble polymerization initiator is a solid initiator, it is preferable to add after dissolving it beforehand in a portion of the monomer.

As for reacting conditions generally, the heating temperature is 60 to 98° C. (preferably 60 to 98° C., more preferably 70 to 95° C. and the polymerizing time is 2 to 20 hours. If the heating temperature is less than 60° C., a reaction (grafting) is not sufficiently carried out and the reaction needs a long time. On the other hand, if the heating temperature exceeds 98° C., boiling of water occurs and grafting occurs suddenly, and heating and foaming occurs.

As a reaction apparatus used in the reacting process, a general emulsion reaction pot can be used and, for example, a reaction pot equipped with a stirring apparatus rotating at 10 to 300 rpm, a temperature controlling apparatus and a cooling tool can be used.

As for the first acryl based monomer unit ($3b$) generally, its reactive group reacts with the acid anhydride group and/or carboxylic acid group in the above-mentioned addition reaction.

BEST MODE FOR CARRYING OUT THE INVENTION

Figure 1:
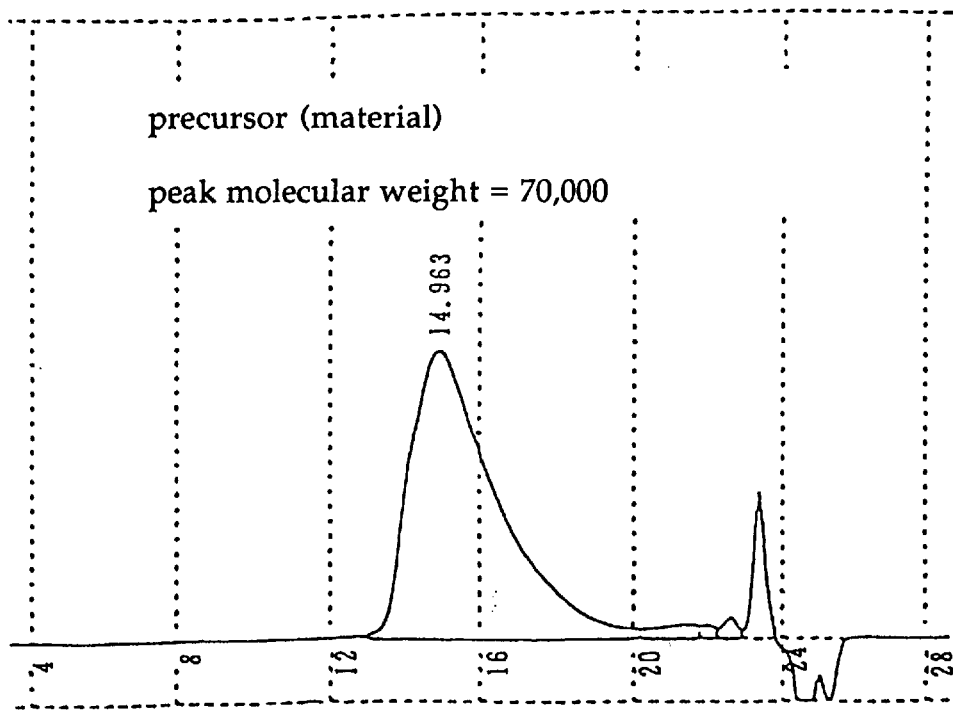
FIG. 1 is a graph depicting the peak molecular weight of a precursor as measured by GPC, where the precursor is used in Example A1.

Hereinafter, the embodiment of the present invention is explained. However, the present invention is not limited to this. Now, "part" means "weight part" and "%" means "weight %".

EXAMPLE A1

A precursor (maleic anhydride was grafted to polypropylene chloride of molecular weight 70,000 and chlorinating ratio of 26%, grafted ratio of precursor of 5%) (90 parts), Emulgen 120 (emulsifier made by Kao sya) (40 parts), styrene (30 parts), methyl methacrylate (25 parts), n-butyl acrylate (25 parts), 2-ethylhexyl acrylate (25 parts) and 2-hydroxyethyl methacrylate (15 parts), respectively, were introduced to a reaction vessel having a capacity of 1 liter, equipped with a stirring apparatus, a cooling tool and a dropping funnel, and a homogeneous solution was obtained by heating to 50° C. and stirring for one hour. After 2,2'-azobis(2-methyl butyronitrile) (1.3 parts) as the oil-soluble initiator was added to this solution, "after-emulsification" was carried out by dropping from a dropping funnel for one hour a solution having dimethylmethanol amine (8 parts) dissolved in deionized water (573 parts). Then heating was carried out to 85° C. for 30 minutes and a reaction was carried out for 4 hours at 85° C. After cooling, an emulsion was obtained by filtrating with a wire net of 400 mesh.

The pH of this emulsion was 8.8 and the average particle diameter of the polymer particles measured by a laser scattering method (DLS-700: made by Otuka Denshi sya) was 0.3 μm. By a method of measuring the remains after heating for one hour at 150° C., it was known that an amount of a solid portion in the emulsion was 29.9 weight %. Monomer smell did not exist in the said emulsion and it was recognized that polymerization was finished almost perfectly.

Next, it was known that the said solid portion included grafted polypropylene chloride by the results of the analysis below.

Figure 2:
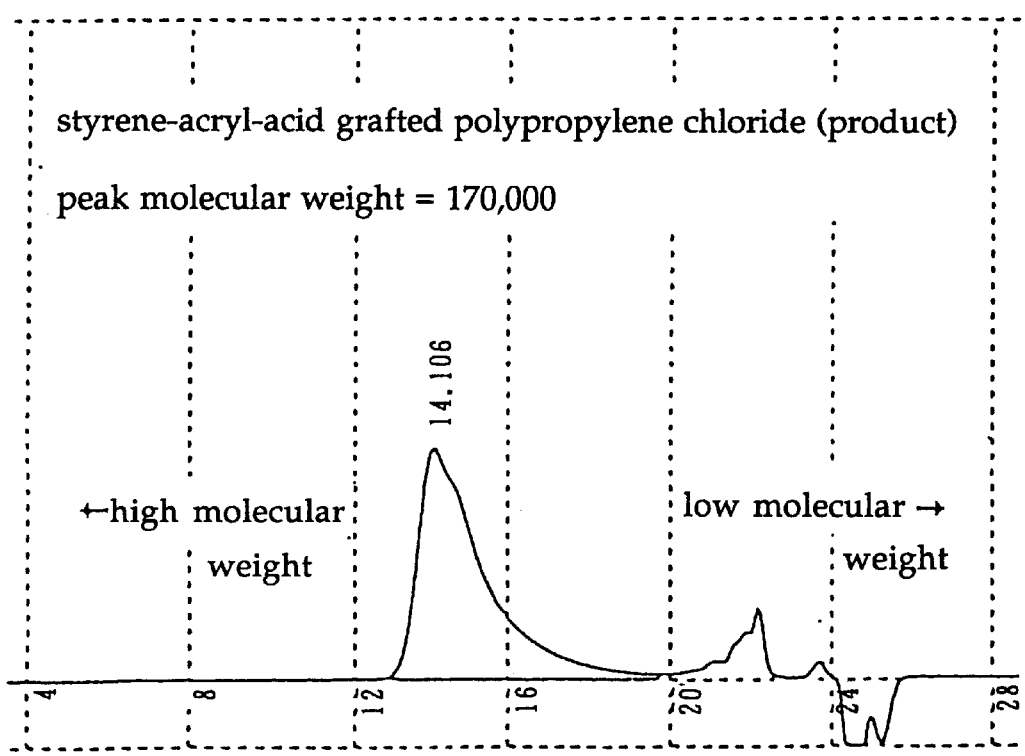
FIG. 2 is a graph depicting the peak molecular weight of styrene-acryl-acid grafted polypropylene chloride as measured by GPC, where the styrene acryl-acid-grafted polypropylene chloride is the solid portion of an emulsion obtained by Example A1.

Please compare the graph depicted by FIG. 2, which was generated by a solid portion in the said emulsion being solvated in THF and then being introduced to the GPC apparatus with the graph depicted by FIG. 1 which was generated by the precursor being introduced to the GPC apparatus. In FIG. 2, the peak of FIG. 1 has vanished (where the peak in FIG. 1 is at a position 70,000 and depicts the precursor). In FIG. 2, there is instead a peak at the position of 170,000 showing conversion to polystyrene.

Figure 3:
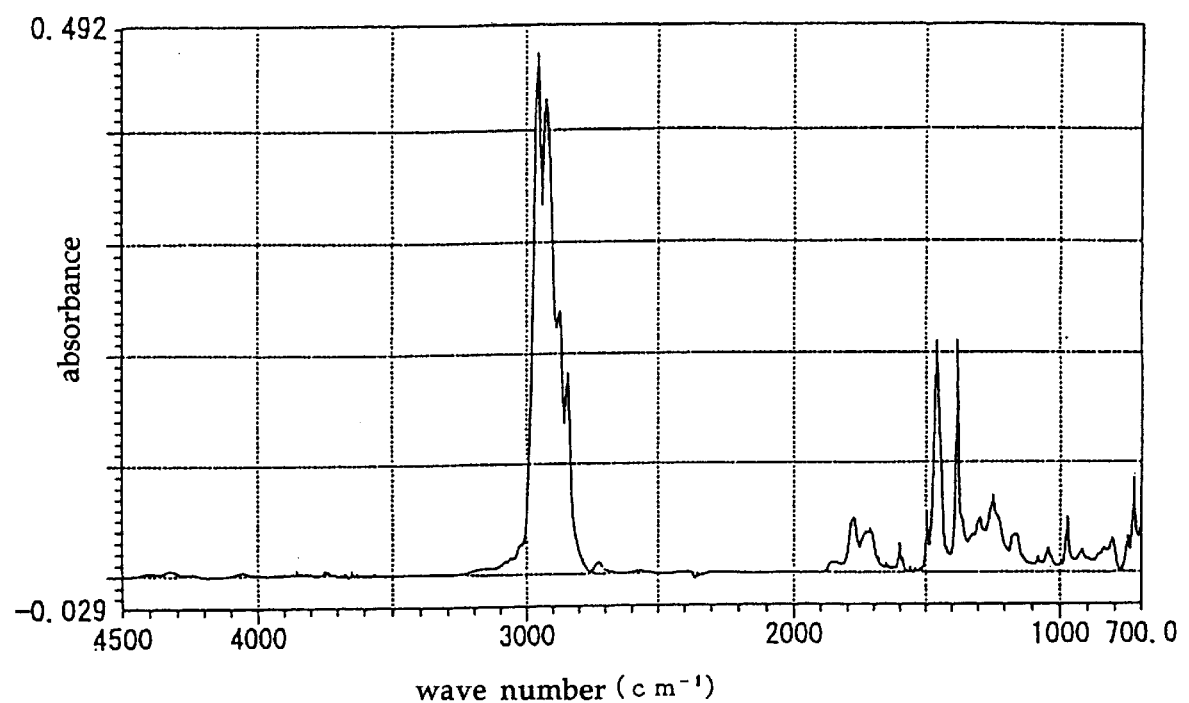
FIG. 3 is a graph depicting the IR absorbance of the precursor used in Example A1.
Figure 4:
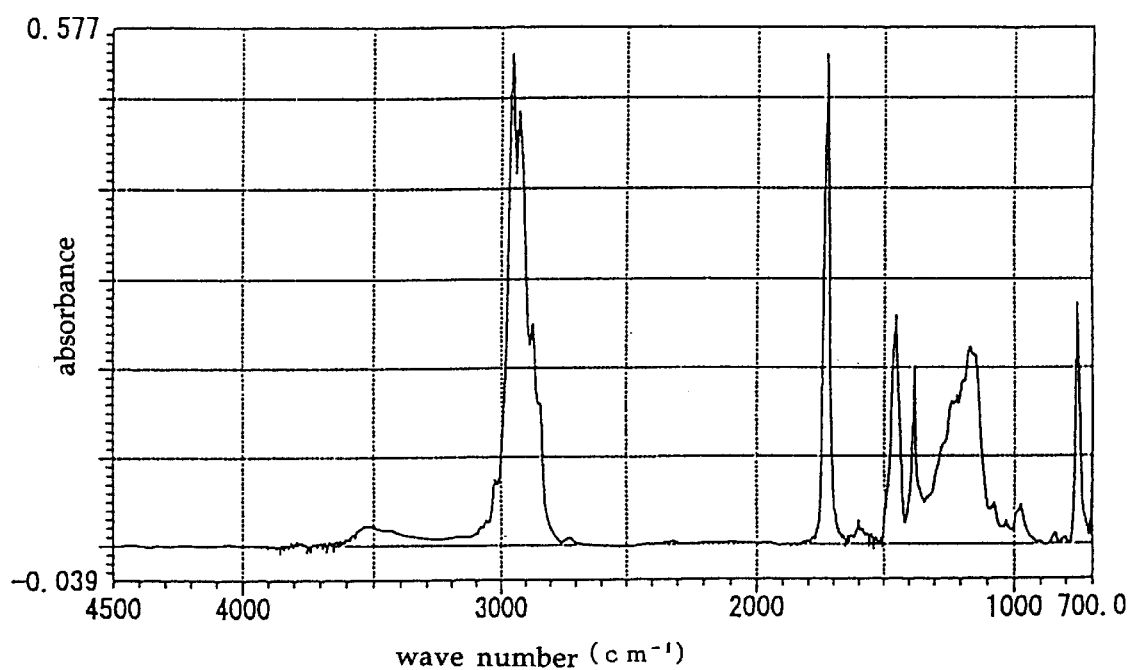
FIG. 4 is a graph depicting the IR absorbance of a solid portion of an emulsion obtained by Example A1.

Please compare the IR measuring result of FIG. 4 (after a solid portion in the said emulsion was washed by ethanol) with the IR measuring result of FIG. 3 (where the precursor is the material measured by the IR spectrometer). In FIG. 4, an absorption of 1780 cm$^{-1}$ generated by the acid anhydride group of the precursor has vanished, and absorptions of 1380, 1450, 2850–2950 cm$^{-1}$ generated by the polyolefin chloride structure and absorptions of 750, 1150–1250, 1730 cm$^{-1}$ generated by the styrene-acryl based polymerization chain structure are observed.

Figure 5:
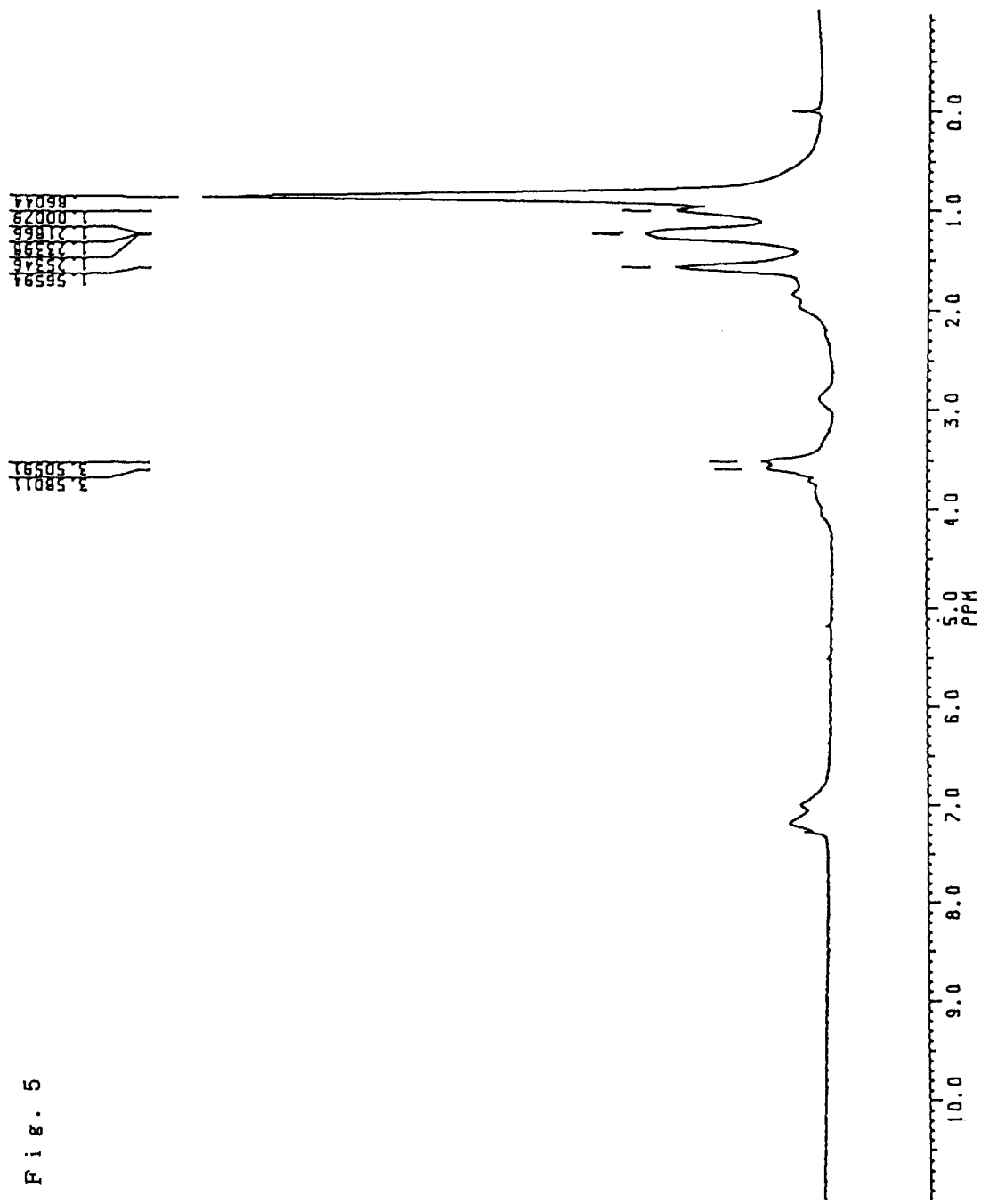
FIG. 5 shows the Nmr spectrum generated by the solid portion of an emulsion obtained by Example A1.

According to the NMR measuring result of FIG. 5 after washing with methanol, a solid portion obtained by precipitation from the said emulsion with methanol, an area ratio of an aromatic proton peak (about 7 ppm) generated by styrene and a proton peak group (0.5–4 ppm) generated by a structure except styrene, such as a methyl group and a methylene group was 7:93. As the said proton peak ratio when 100% of styrene is reacted is theoretically 7.3:92.7, it was recognized that styrene was reacted almost quantitatively.

On the other hand, the acid value of the said solid portion measured by 1/10 N potassium hydroxide was 5 KOH mg/g. This acid value corresponds to the amount of carboxyl groups in the grafted polypropylene chloride. Considering that a grafting rate of maleic anhydride of the said precursor was 5%, it was known that a carboxyl group in grafted polypropylene chloride plays no part in a grafting combination of the polypropylene chloride structure moiety with the styrene-acryl based polymerization chain structure moiety.

EXAMPLE A2

The precursor (maleic anhydride was grafted to polypropylene chloride of molecular weight 80,000 and chlorinating ratio of 22%, grafted ratio of precursor of 3%) (125 parts), Emulgen 920 (emulsifier made by Kao sya) (20 parts), styrene (23 parts), methyl methacrylate (30 parts), 2-ethylhexyl acrylate (33 parts) and 2-hydroxyethyl methacrylate (9 parts), respectively, were introduced to a reaction vessel having a capacity of 1 liter, equipped with a stirring apparatus, a cooling tool and a dropping funnel, and a homogeneous solution was obtained by heating to 100° C. and stirring for one hour. "After-emulsification" was carried out by dropping from a dropping funnel for one hour a solution having 2-amino-2-methylpropanol 6 parts dissolved in deionized water (573 parts). Then a mixed solution of 2,2'-azobis(2-methyl butyronitrile) (0.8 parts)and 2,2'-azobis(2,4-dimethyl valeronitrile) (0.8 parts) as the oil-soluble initiator was added to this solution, and after stirring for 2 hours, heating was carried out to 75° C. for 30 minutes and a reaction was carried out for one hour at 75° C. and it was stirred for 3 hours at 85° C. and polymerization was finished. After cooling, an emulsion was obtained by filtrating with a wire net of 400 mesh.

It was known from the same measurement as in example A1 that the pH of this emulsion was 8.2 and the average particle diameter of polymer particles was 0.2 μm and an amount of a solid portion was 29.8 weight %. Monomer smell did not exist in the emulsion.

It was known from the same measurement as in example A1 that a solid portion in the emulsion has a GPC peak at a position of 180,000 (showing conversion to polystyrene) and that the acid value of the solid portion was 4 KOH mg/g. Therefore, it was known from the experience of example A1 that this solid portion included grafted polypropylene chloride.

EXAMPLE A3

The precursor (maleic anhydride was grafted to polypropylene chloride of molecular weight 60,000 and chlorinating ratio of 28%, grafted ratio of precursor of 3%) (150 parts), Emulgen 430 (emulsifier made by Kao sya) (20 parts), styrene (23 parts), methyl methacrylate (15 parts), 2-ethylhexyl acrylate (33 parts), 2-hydroxyethyl methacrylate (9 parts), triethylamine (7 parts) and 2,2'-azobis(2-methyl butyronitrile) (1.6 parts) were introduced to a reaction vessel having a capacity of 1 liter, equipped with a stirring apparatus, a cooling tool and a dropping funnel, and a homogeneous solution was obtained by heating to 60° C. and stirring for one hour. "After-emulsification" was carried out by dropping deionized water (573 parts) from a dropping funnel for one hour. Then, heating was carried out to 85° C. for 30 minutes and the reaction was carried out for 4 hours at 85° C. After cooling, it was filtrated with a wire net of 400 mesh.

It was known from the same measurement as in example A1 that the pH of this emulsion was 8.8 and the average particle diameter of polymer particles was 0.4 μm and an amount of a solid portion was 29.8 weight %. Monomer smell did not exist in the emulsion.

It was known from the same measurement as example A1 that a solid portion in the emulsion has GPC peaks at positions of 60,000 and 160,000 (showing conversion to polystyrene) and that the acid value of the solid portion was 6 KOH mg/g. Therefore, it was known from the experience of example A1 that this solid portion included grafted polypropylene chloride.

EXAMPLES A4 to A6

Comparative Examples A1 to A4

Emulsions of examples A4 to A6 and comparative examples A1 to A4 were made with the same method as example A2. Mixing of materials and the characteristics of obtained emulsions are shown in Table 1 and Table 2.

Acid values were measured in the same way as examples A1, and were 6 KOH mg/g in example A4, 10 KOH mg/g in example A5, and 3 KOH mg/g in example A6. Now, the acid value of example A5 is caused from the carboxyl group in the grafted polypropylene chloride and Antox MS-60 as the emulsifier. It was known from measuring acid values that grafted polypropylene chloride was obtained in examples A4 to A6.

In examples B1 to B6, aqueous primers were prepared using emulsions obtained by examples A1 to A6 and physical properties were measured.

EXAMPLE B1

After a water-soluble acryl resin (made by Arakawa Kagaku Kogyo & Co., Ltd, fixed solid portion of 30%) (18 parts), carbon black (4 parts), titanium oxide (49 parts), silica (5 parts), antifoamer (1 part) and N-methyl pyrrolidone (23 parts) were premixed, pigment paste was prepared by using a sand grinder mill.

After an emulsion (50 parts) including grafted polypropylene chloride of example A1 and an acryl resin emulsion (made by Nihon Bee Chemical & Co., Ltd, fixed solid portion of 30%) (32 parts) were added to this pigment paste (15 parts), an aqueous primer (1) was prepared by mixing surface adjusting agent (2 parts) and viscosity increasing agent (1 part).

EXAMPLES B2~B6

Aqueous primers (2) to (6) were prepared in the same way as example B1 except that the emulsion of example A1 was substituted for by emulsions of examples A2 to A6.

About these aqueous primers (2) to (6), efficiency was evaluated by the evaluating method mentioned below. The evaluating results are shown in Table 3.

Evaluating Method of aqueous primers

To polyolefin material washed by a neutral detergent, an aqueous primer was spray-coated in a dry film thickness of 10 μm, and it was dried at 120° C. for 15 minutes. After cooling, a solvent based metallic base layer (made by Nihon Bee Chemical & Co., Ltd) was spray-coated on the aqueous primer in a drying film thickness of 15 μm and then a solvent based clear layer (made by Nihon Bee Chemical & Co., Ltd) was spray-coated on the solvent based metallic-base layer in a drying film thickness of 30 μm, and then such was dried at 120° C. for 30 minutes and a test piece was manufactured.

A checkcross-cut tape test was carried out to the test pieces and adhesion was evaluated. Water resistance, moisture resistance, hot water resistance and gasoline resistance were evaluated by a second adhesion (a check cross-cut tape test) after the respective condition shown in Table 3 was noted. Now, the evaluating standard was as follows:

O: 0/100 (no exfoliation)

Δ: 1/100~50/100 (exfoliation of 50% or below)

x: 51/100~100/100 (exfoliation of 50% or more)

As for coating stability, an aqueous primer (400 milliliter) was introduced to a flat-bottom type beaker of 500 milliliter and after stirring at 200 rpm at room temperature for 24 hours by using a magnetic stirrer coated with Teflon (trademark of du Pont sya), separation and sinking of pigment were measured and evaluated.

Now, as for compatibility, in examples B1 to B6, a composition excluding carbon black, titanium oxide, silica, antifoamer, surface adjusting agent and viscosity increasing agent was coated to a glass plate and was dried and a drying film was obtained, and the turbidity of the drying film was evaluated visually. The evaluating standard was as follows:

Transparent: compatibility good turbidity large: compatibility bad

The above noted evaluating results are shown in Table 3.

INDUSTRIAL APPLICATION

An emulsion according to the present invention has enough coating and adhesion to polyolefin materials and is excellent in compatibility with an acrylic resin and other resins.

This emulsion is excellent in thermal and mechanical stability and, as its polymer particles are particles of little diametrical area, is excellent in storage stability.

This emulsion is suitable for producing a coating composition for plastic objects and films made of polyolefin materials such as a polypropylene polymer, an ethylene-propylene copolymer and an ethylene-propylene-diene copolymer. When this emulsion is used as a paint resin such as an aqueous primer painting composition and an ink, an adhesive and a sealing agent, it exhibits excellent compatibility to other resins such as an acrylic resin and raises adhesion of a film. This emulsion is especially suitable for being used as a material for an aqueous primer painting composition.

By the emulsion production method according to the present invention, the above-mentioned emulsion is obtained efficiently and easily.

What is claimed is:

1. An emulsion comprising:
    a) a styrene-acryl-acid grafted polyolefin chloride, which includes:
        i) a polyolefin chloride structure moiety (1),
        ii) an acid anhydride and/or carboxylic acid structure moiety (2) bonded to the moiety (1) and
        iii) a styrene-acryl based polymerization chain moiety (3) bonded to the moiety (2),
        iv) wherein the acid anhydride and/or carboxylic acid structure moiety (2) includes acid anhydride groups and/or carboxylic acid groups after being bonded between moiety (1) and moiety (3),
        v) wherein a ratio of the moiety (2) to a sum of the moiety (1) and the moiety (2) is 1–10 weight %;
    b) an emulsifier;
    c) a basic substance including at least one of an amine compound and ammonia; and
    d) water.

2. An emulsion according to claim 1, wherein a ratio of a sum of the moiety (1) and the moiety (2) to the moiety (3) is 10–200 weight %.

3. An emulsion according to claim 1, wherein, in a sum of the moiety (1) and the moiety (2), chlorine content ratio is 10–40 weight % and molecular weight is 3000–200000.

4. An emulsion according to claim 1, wherein the moiety (3) includes styrene based monomer unit (3a) at 10–70 weight % of the whole moiety (3).

5. A production process for an emulsion comprising the steps of:
   a) preparing a suspension that comprises:
      i) a precursor, which includes a polyolefin chloride structure moiety (1) and an acid anhydride and/or carboxylic acid structure moiety (2) bonded to the moiety (1), wherein a ratio of the moiety (2) to a sum of the moiety (1) and the moiety (2) is 1–10 weight %;
      ii) a styrene based monomer;
      iii) a first acryl based monomer, which has a group reactable with the moiety (2);
      iv) a second acryl based monomer, which does not have a group reactable with the moiety (2);
      v) an emulsifier;
      vi) a basic substance including at least one of an amine compound and ammonia;
      vii) an oil soluble polymerization initiator; and
      viii) water; and
   b) heating the suspension and grafting a styrene-acryl based polymerization chain to the precursor.

6. A production process for an emulsion according to claim 5, wherein the step of preparing the suspension comprises:
   a) the step of mixing the precursor at least with a styrene based monomer, a first acryl based monomer and a second acryl based monomer to obtain a homogeneous solution of the precursor; and
   b) the step of mixing the homogeneous solution of the precursor at least with water to obtain the suspension.

7. An emulsion according to claim 2, wherein, in a sum of the moiety (1) and the moiety (2), chlorine content ratio is 10–40 weight % and molecular weight is 3000–200000.

8. An emulsion according to claim 2, wherein the moiety (3) includes styrene based monomer unit (3a) at 10–70 weight % of the whole moiety (3).

9. An emulsion according to claim 3, wherein the moiety (3) includes styrene based monomer unit (3a) at 10–70 weight % of the whole moiety (3).

* * * * *